United States Patent
Marti et al.

(10) Patent No.: US 11,632,625 B2
(45) Date of Patent: Apr. 18, 2023

(54) SOUND MODIFICATION BASED ON DIRECTION OF INTEREST

(71) Applicant: HARMAN INTERNATIONAL INDUSTRIES, INCORPORATED, Stamford, CT (US)

(72) Inventors: Stefan Marti, Oakland, CA (US); Evgeny Burmistrov, Saratoga, CA (US); Priya Seshadri, San Francisco, CA (US); Joseph Verbeke, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/588,006

(22) Filed: Jan. 28, 2022

(65) Prior Publication Data

US 2022/0159371 A1    May 19, 2022

Related U.S. Application Data

(63) Continuation of application No. 17/037,344, filed on Sep. 29, 2020, now Pat. No. 11,259,112.

(51) Int. Cl.
*H04R 1/20* (2006.01)
*H04R 3/00* (2006.01)
(Continued)

(52) U.S. Cl.
CPC ............. *H04R 1/326* (2013.01); *G06F 3/012* (2013.01); *G06F 3/013* (2013.01); *G06F 3/017* (2013.01); *H04R 3/00* (2013.01)

(58) Field of Classification Search
CPC . H04R 3/00; H04R 3/005; H04R 3/04; H04R 3/12; H04R 1/20; H04R 1/22; H04R 1/32; H04R 1/40; H04R 1/403; H04R 1/406; H04R 1/326; H04R 25/407; H04R 225/41; H04R 225/43; H04R 225/61; G06F 3/01; G06F 3/011; G06F 3/012; G06F 3/013; G06F 3/017; G06F 3/16; (Continued)

(56) References Cited

U.S. PATENT DOCUMENTS 9,716,939 B2   7/2017  Di Censo et al.
10,068,363 B2  9/2018  Laaksonen et al.
(Continued)

OTHER PUBLICATIONS

"Harman|Audio Augmented Reality", (online video), Silencio Films, https://vimeo.com/131272237, retrieved May 17, 2021, 2 pages.
(Continued)

*Primary Examiner* — Thang V Tran
(74) *Attorney, Agent, or Firm* — Artegis Law Group, LLP

(57) ABSTRACT

Techniques for modifying sound based on a direction of interest include determining a direction of interest associated with a user; receiving a set of audio signals associated with the direction of interest; determining one or more salient frequency bands within the set of audio signals; in response to receiving a command from the user to enhance or suppress the set of audio signals, enhancing or suppressing a portion of the set of audio signals corresponding to the one or more salient frequency bands to create a modified set of audio signals; and outputting the modified set of audio signals.

20 Claims, 6 Drawing Sheets

(51) Int. Cl.
*G06F 3/01* (2006.01)
*H04R 1/32* (2006.01)

(58) Field of Classification Search
CPC ... G10L 15/20; G10L 21/028; G10L 21/0388; G10L 25/21; G10L 25/78; H04S 7/303; H04S 7/307
See application file for complete search history.

(56) References Cited

U.S. PATENT DOCUMENTS

| | | | |
|---|---|---|---|
| 10,388,297 B2 | 8/2019 | Di Censo et al. | |
| 2007/0025562 A1 | 2/2007 | Zalewski et al. | |
| 2010/0074460 A1* | 3/2010 | Marzetta | G02C 11/06 381/313 |
| 2011/0206226 A1 | 8/2011 | Pandey et al. | |
| 2013/0223660 A1* | 8/2013 | Olafsson | H04R 25/407 381/313 |
| 2015/0110285 A1 | 4/2015 | Di Censo et al. | |
| 2017/0098457 A1 | 4/2017 | Zad Issa | |
| 2017/0221500 A1* | 8/2017 | Glasgow | G06F 3/013 |
| 2017/0287499 A1* | 10/2017 | Duong | G10L 21/0364 |
| 2017/0339487 A1 | 11/2017 | Alvord et al. | |
| 2018/0270571 A1 | 9/2018 | Di Censo et al. | |
| 2018/0288307 A1* | 10/2018 | Allie | H04N 5/23296 |
| 2018/0352343 A1* | 12/2018 | Recker | G06F 3/165 |

OTHER PUBLICATIONS

"Technology—Leap Motion", Ultraleap Ltd, https://www.leapmotion.com/technology/, snapshot dated Dec. 15, 2019, from https://web.archive.org/web/20191215002033, retrieved May 17, 2021, 8 pages.

"Powerful 3D depth sensing for every product," pmdtechnologies ag, https:/lwww.pmdtec.com/mwc/, snapshot dated Aug. 13, 2020 from https://web.archive.org/web/20200813052455/htlps:/lwww.pmdtec.com/mwc/, retrieved May 17, 2021, 12 pages.

"SparkFun 9DoF Razor IMU M0," SparkFun Electronics, https://www.sparkfun.com/products/retired/14001, retrieved May 17, 2021, 10 pages.

\* cited by examiner

SOUND MODIFICATION BASED ON DIRECTION OF INTEREST

CROSS-REFERENCE TO RELATED APPLICATIONS

The present application is a continuation of United States application titled "SOUND MODIFICATION BASED ON DIRECTION OF INTEREST," filed on Sep. 29, 2020, and having Ser. No. 17/037,344. The subject matter of this related application is hereby incorporated herein by reference.

BACKGROUND

Field of the Various Embodiments

The disclosed embodiments relate generally to audio systems and, more specifically, to techniques for modifying sound based on a direction of interest.

Description of the Related Art

A conventional audio system, such as a personal sound amplification product or a hearing aid, generally outputs audio signals to a user. Those audio signals could be derived from ambient and/or environmental sounds.

A drawback of conventional audio systems, such as those described above, is that conventional system generally increase or decrease the amplitude of all of the sounds received at the position of the user without regard for whether certain sounds are particularly interesting or important to the user. For example, a personal sound amplification product amplifies received sounds indiscriminately. However, this situation can be problematic if certain sounds are more important to the user than others. For example, certain other sounds in the environment may be drowning out the sounds that the user wants to hear. When sounds are indiscriminately amplified, the user gains little or no advantage in hearing the desired sounds because the undesired sounds are amplified as well. Accordingly, conventional audio systems fail to facilitate user focus on the desirable sounds.

In response to the above-mentioned drawbacks, some audio systems implement audio processing techniques that attempt to identify sound sources and extract sound events. For example, these audio systems could process audio signals to identify sounds from persons, sounds from machinery, sounds from animals, etc. A drawback of these approaches, however, is that these audio processing techniques are computationally expensive both in terms of time and processing resources. Accordingly, audio systems implementing these techniques would need to be equipped with advanced processors and/or additional data storage, which can make such audio systems cost-prohibitive for users.

As the foregoing illustrates, what is needed are more effective techniques for sound modification.

SUMMARY

One embodiment sets forth a computer-implemented method comprising determining a first direction of interest associated with a user, receiving a set of audio signals associated with the first direction of interest, determining a first dominant frequency band within the set of audio signals, modifying a first portion of the set of audio signals corresponding to the first dominant frequency band, and outputting the modified set of audio signals.

Further embodiments provide, among other things, one or more computer-readable storage media and a system configured to implement the methods set forth above.

One technical advantage of the disclosed techniques relative to the prior art is that the audio system can enhance desired audio signals and/or reduce unwanted audio signals, thereby providing the user with increased control over the surrounding acoustic environment. Another technical advantage of the disclosed techniques is that sounds originating from a direction of interest can be modified in a more simplified implementation compared to prior art techniques. Accordingly, directional sound modification can be provided at a lower cost.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
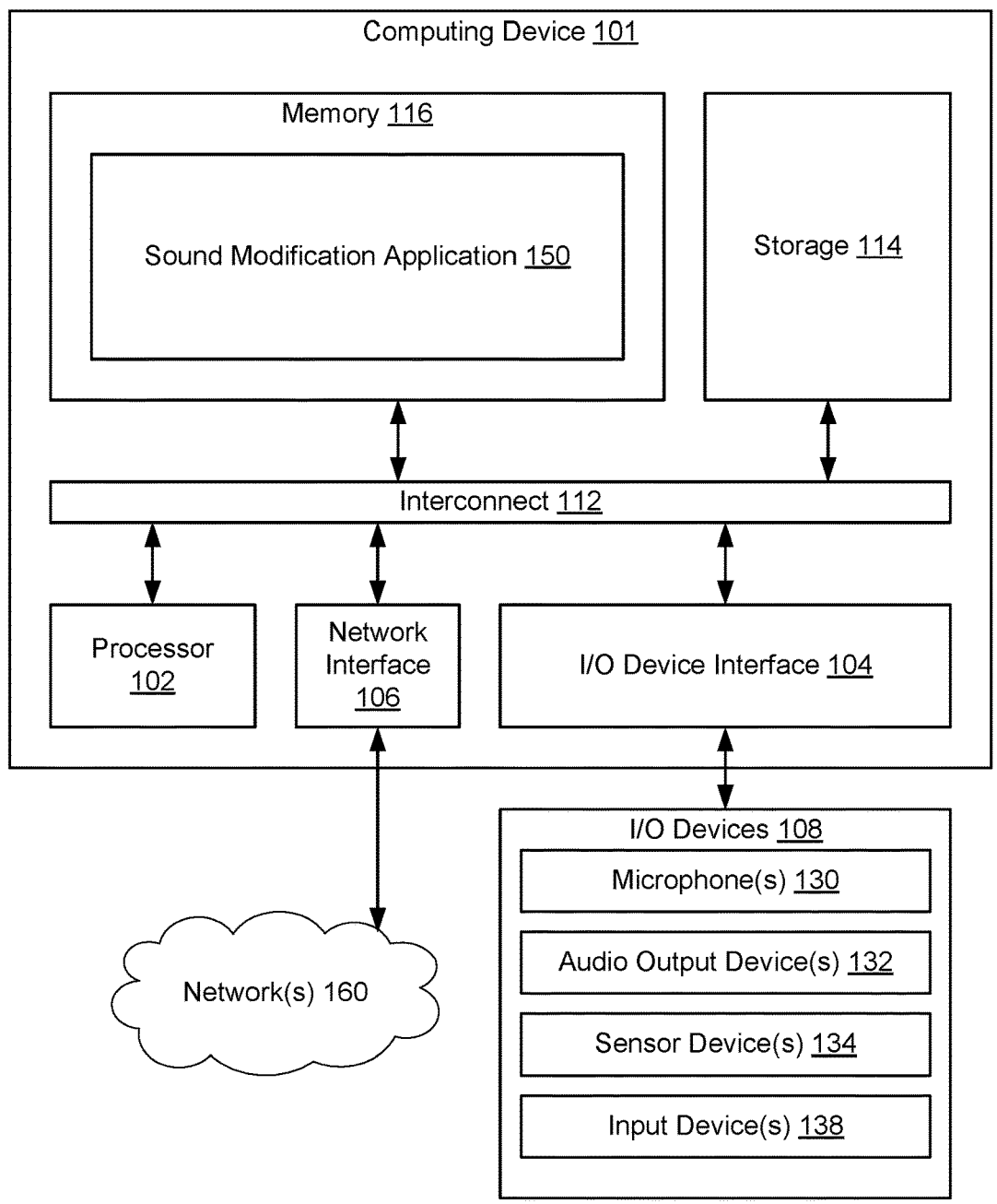
FIG. 1 illustrates a sound modification system configured to implement one or more aspects of the various embodiments.

FIG. 1 illustrates a sound modification system 100 configured to implement one or more aspects of the various embodiments. In various embodiments, sound modification system 100 may be implemented in a wearable system (e.g., a headphones, a headset earbuds), and a user can wear the wearable sound modification system 100 in an environment. For example, sound modification system 100 could be implemented in a head-wearable form factor (e.g., over-the-ear headphones, a headset).

As shown, sound modification system 100 includes, without limitation, computing device 101, input/output (I/O) device(s) 108, and optionally network(s) 160. Computing device 101 includes a processor 102, I/O device interface 104, network interface 106, interconnect 112 (e.g., a bus), storage 114, and memory 116. Memory 116 stores sound modification application 150. Processor 102 and memory 116 may be implemented in any technically feasible fashion. For example, and without limitation, in various embodiments, any combination of processor 102 and memory 116 may be implemented as a stand-alone chip or as part of a more comprehensive solution that is implemented as an application-specific integrated circuit (ASIC), a system-on-a-chip (SoC), and/or the like. Processor 102, I/O device interface 104, network interface 106, storage 114, and memory 116 can be communicatively coupled to each other via interconnect 112.

The one or more processors 102 may include any suitable processor, such as a central processing unit (CPU), a graphics processing unit (GPU), an application-specific integrated circuit (ASIC), a field programmable gate array (FPGA), a tensor processing unit (TPU), any other type of processing unit, or a combination of multiple processing units, such as a CPU configured to operate in conjunction with a GPU. In general, each of the one or more processors 102 may be any technically feasible hardware unit capable of processing data and/or executing software applications and modules.

Storage 114 may include non-volatile storage for applications, software modules, and data, and may include fixed or removable disk drives, flash memory devices, and CD-ROM, DVD-ROM, Blu-Ray, HD-DVD, or other magnetic, optical, solid state storage devices, and/or the like.

Memory 116 may include a random access memory (RAM) module, a flash memory unit, or any other type of memory unit or combination thereof. The one or more processors 102, I/O device interface 104, and network interface 106 are configured to read data from and write data to memory 116. Memory 116 includes various software programs and modules (e.g., an operating system, one or more applications) that can be executed by processor 102 and application data (e.g., data loaded from storage 114) associated with said software programs.

In some embodiments, computing device 101 is communicatively coupled to one or more networks 160. Network(s) 160 may be any technically feasible type of communications network that allows data to be exchanged between computing device 101 and remote systems or devices (not shown), such as a server, a cloud computing system, or other networked computing device or system. For example, network 160 may include a wide area network (WAN), a local area network (LAN), a wireless network (e.g., a Wi-Fi network, a cellular data network), and/or the Internet, among others. Computing device 101 may connect with network(s) 160 via network interface 106. In some embodiments, network interface 106 is hardware, software, or a combination of hardware and software, that is configured to connect to and interface with network(s) 160.

In some embodiments, computing device 101 is communicatively coupled to a local device separate from computing device 101. For example, computing device 101 could be paired with another device (e.g., a smartphone, a tablet computer, a notebook or desktop computer) associated with the user and located in proximity to computing device 101. Computing device 101 may be coupled to the another device via network interface 106 (e.g., via network(s) 160) and/or via I/O device interface 104 by wire or wirelessly in any technically feasible manner (e.g., Universal Serial Bus (USB), Bluetooth, ad hoc Wi-Fi).

I/O devices 108 may include devices capable of providing input, as well as devices capable of providing output, such as a display device, audio output device, etc. For example, in various embodiments, I/O devices 108 include one or more microphones 130, audio output device(s) 132, sensor devices 134, one or more input device(s) 138, and optionally one or more display devices. Examples of input devices 138 include, without limitation, a touch-sensitive surface (e.g., a touchpad), a microphone, a touch-sensitive screen, buttons, knobs, dials, and/or the like. Further, in some embodiments, one or more sensor devices 134 can be used for detecting user inputs (e.g., hand and/or facial gestures performed by the user). Examples of display devices include, without limitation, LCD displays, LED displays, touch-sensitive displays, transparent displays, projection systems, and/or the like. Additionally, I/O devices 108 may include devices capable of both receiving input and providing output, such as a touch-sensitive display, and/or the like.

Microphone(s) 130 includes one or more microphones for receiving sounds from the environment. Microphone(s) 130 may include, without limitation, unidirectional microphones, omnidirectional microphones, directional microphones, a microphone array, beam-forming microphones, microelectro-mechanical (MEMS) microphones, laser-based microphones, microphones using parabolic mirrors, and/or the like. In implementations where sound modification system 100 is implemented in a wearable form factor, microphones 130 may be located at various positions on a chassis or frame of the wearable. In some embodiments, microphone(s) 130 include a directional microphone or directional microphone array. The directional microphone or directional microphone array can be oriented (e.g., steered) toward a given direction physically (e.g., via mechanical manipulation of the microphone or microphone array) or via application of signal processing techniques (e.g., beamforming). In some embodiments, the directional microphone or directional microphone array is mounted on a pan-tilt assembly in combination with a gimbal, and sound modification system 100 includes an actuation mechanism (not shown) for physically manipulating the pan-tilt assembly and/or the gimbal. In some embodiments, microphones 130 includes one or more of an omnidirectional microphone, a directional microphone and/or a directional microphone array.

Audio output device(s) 132 include one or more devices capable of outputting sound to the user. In some embodiments, audio output devices 132 output sound to one or more ears of the user (e.g., for private listening by the user). Audio output device(s) 132 may include, without limitation, headphones, earbuds, headsets, bone conduction speakers, shoulder worn and shoulder mounted headphones, around-neck speakers, and/or the like.

I/O devices 108 further include one or more sensor devices 134. Sensor device(s) 134 monitor the user of sound modification system 100 in order to detect inputs made by the user and/or motion of the user. In various embodiments, outward sensor device(s) 134 include one or more gesture detection sensors. More generally, these gesture detection sensors monitor an area proximate to the user to detect motions (e.g., hand and arm motions, facial motions) indicative of gestures (e.g., hand gestures, facial gestures) performed by the users. Gesture detection sensors can include, for example, imaging devices (e.g., an RGB camera, an infrared camera), light emitting devices (e.g., finger-mounted light emitting diode) working in conjunction with the imaging devices, muscle activity sensors, inertial sensors, and/or a finger-mounted sensor working in conjunction with another sensor that detects the finger-mounting sensor.

Sensor devices 134 can further include one or more inertial measurement sensors. These inertial measurement sensors can be used to detect movements and orientation changes made by the user (e.g., walking from one spot to another, turning the head, turning the body). The inertial measurement sensors can include, for example, an accelerometer (e.g., a 3-axis accelerometer), a magnetometer (e.g., a 3-axis magnetometer), and/or a gyroscope (e.g., a 3-axis electronic gyroscope).

Memory 116 includes a sound modification application 150. Sound modification application 150 may be stored in and loaded from storage 114. In operation, sound modification application 150 receives electrical audio signals captured via microphone(s) 130 (e.g., audio signals converted by microphone(s) 130 from sound waves produced by sound sources in an environment). The audio signals captured via microphone(s) 130 and received by sound modification application 150 may be a mix of audio signals originating from multiple sources. Sound modification application 150 also receives one or more user inputs via input devices 138 and/or sensor devices 134. Sound modification application 150 determines a direction of interest based on the user inputs. In some embodiments, sound modification application 150 also determines one or more sound modification parameters (e.g., enhance or suppress, magnitude of modification) based on the user inputs. In some embodiments, a gesture indicating sound modification parameters can follow or precede a gesture indicating the direction of interest. For example, a user can perform, with his or her hand, a gesture pointing at a certain direction as the direction of interest, and then with the same hand perform a palm raising gesture to indicate that audio signals from the direction of interest is to be enhanced, or the user can first perform the palm raising gesture and then perform the pointing gesture. Examples of hand gestures for indicating sound modification parameters include, without limitation, a palm lift-up or press-down gesture, a thumbs up or down gesture (with or without upward/downward hand motion), or a horizontal sideway swipe gesture with a hand (e.g., to indicate muting of a sound). As another example, a user can perform a facial gesture (e.g., "make a face") to indicate one or more sound modification parameters. Examples of facial gestures include, without limitation, raising eyebrows, furrowing eyebrows, flaring and/or expanding nostrils, tightening nostrils, compressing or "scrunching" the nose, pursing lips, raising a corner of the lips, clenching the jaw, and/or the like. In some other embodiments, sound modification application 150 can determine a direction of interest based on other inputs (e.g., determining a user gaze direction, determining a head orientation or a direction the head of the user is facing, a gaze direction or a head orientation in conjunction with a user voice input confirming the gaze direction or head orientation as the direction of interest).

Sound modification application 150 captures audio signals originating from the direction of interest as determined based on the user inputs. In some embodiments, sound modification application 150 can physically orient a directional microphone or directional microphone array toward the direction of interest. In some other embodiments, sound modification application 150 can apply beamforming techniques to audio signals captured by microphones 130 to focus on audio signals originating from the direction of interest (e.g., to steer a microphone beam of microphones 130 toward the direction of interest). Sound modification application 150 can further receive audio signals captured from the environment (e.g., omnidirectional audio signals).

Sound modification application 150 processes the audio signals originating from the direction of interest to determine one or more dominant or salient frequency bands within the audio signals originating from the direction of interest. In some embodiments, the dominant or salient frequency bands include frequencies within the audio signals that have significant energy (e.g., an overall peak amplitude within the audio signals; an amplitude above a threshold; an amplitude that is at least a minimum amount or percentage above a threshold). In some embodiments, the threshold is configured (e.g., predefined or preconfigured, configured by the user), and can be set as a percentage or amount (e.g., fixed percentage or amount) above a mean or median energy (e.g., amplitude) across the frequency spectrum of the audio signals. In some embodiments, a dominant frequency band includes a significant-energy (a peak) frequency and a range of frequencies around the peak frequency. For example, if a significant-energy frequency is 1.5 kHz, the dominant frequency band can be a band from 1.25 kHz to 1.75 kHz (+/−0.25 kHz from 1.5 kHz). In some embodiments, the width of the range around the peak frequency is predefined and set as defaults. The processing can include, for example, an analysis of the audio signals originating from the direction of interest to create spectrogram data for the audio signals and an analysis of the spectrogram data to identify high-energy frequency bands. The processing can also include, for example, applying a transform (e.g., a Fourier transform) to the audio signals originating from the direction of interest and analyzing the transformed audio signals to identify significant-energy frequency bands. It should be appreciated that there can be more than one dominant frequency band (e.g., if there are multiple peak frequencies above a threshold).

Sound modification application 150 then proceeds to modify the audio signals originating from the direction of interest. In some embodiments, sound modification application 150 generates a parametric equalizer setting that targets the one or more determined dominant or salient frequency bands. A parametric equalizer setting can be generated to enhance the dominant or salient frequency bands. For example, the parametric equalizer setting could be applied to audio signals originating from the direction of interest to enhance the dominant frequency bands within those audio signals, and those audio signals with the enhancement would be mixed with an omnidirectional signal. On the opposite end, a parametric equalizer setting can be generated to suppress the dominant or salient frequency bands. For example, the parametric equalizer setting could be applied to an omnidirectional audio signal, and the omnidirectional audio signal with the suppression could optionally be mixed with de-amplified audio signals originating from the direction of interest. Sound modification application 150 applies the parametric equalizer setting to the audio signals originating from the direction of interest. In some embodiments, additionally or alternatively, sound modification application 150 applies the parametric equalizer setting to an omnidirectional audio signal to modify a portion within the omnidirectional audio signal that originates from the direction of interest.

In some embodiments, sound modification application 150 can suppress the dominant or salient frequency bands by first applying the parametric equalizer setting to the audio signals originating from the direction of interest to enhance the dominant or salient frequency bands, then inverting the enhanced audio signals, and then mixing the inverted enhanced audio signals with an omnidirectional audio signal, thereby cancelling the dominant or salient frequency bands to be suppressed from the omnidirectional audio signal. In some other embodiments, the inverted enhanced audio signals are output to audio output device(s) 132 without additional mixing (e.g., mixing with an omnidirectional audio signal), thereby cancelling the environmental sound waves originating from the relevant sound source(s) in the direction of interest that may enter the ears of the user (e.g., if the audio output device(s) 132 are open to environmental sound waves). In some embodiments, these cancellation approaches can be gradual, such that the more the inverted signal is added (e.g., the higher amplitude the inverted signal), then the more the relevant sound source(s) are cancelled.

After modifying the audio signals originating from the direction of interest (e.g., by applying a parametric equalizer), sound modification application 150 outputs the modified audio signals originating from the direction of interest to audio output devices 132 for output to the user. In some embodiments, sound modification application 150 can mix the modified audio signals with an omnidirectional audio signal (e.g., captured by an omnidirectional microphone) and output the mix to audio output devices 132.

In some embodiments, sound modification application 150 can detect, via sensor devices 134 (e.g., inertial measurement sensors), changes in changes in orientation and/or location of the user (e.g., orientation of the face or head of the user) and maintain the direction of interest indicated by the user inputs across those changes in orientation and/or location. For example, if the user turns his or her head and/or moves to another spot, sound modification application 150 can detect the head-turning and/or the movement via sensor devices 134 and adjust microphones 130 and/or the beamforming processing accordingly to maintain the direction of interest.

In some embodiments, sound modification application 150 ceases modifying audio signals originating from the direction of interest in response to an input from the user. For example, the user could issue a voice command, make a gesture, etc. (e.g., via input devices 138 and/or sensor devices 134) commanding sound modification application 150 to cease modifying audio signals. In response, sound modification application 150 ceases modifying audio signals originating from the direction of interest or even disables audio output to audio output devices 132.

Figure 2A:
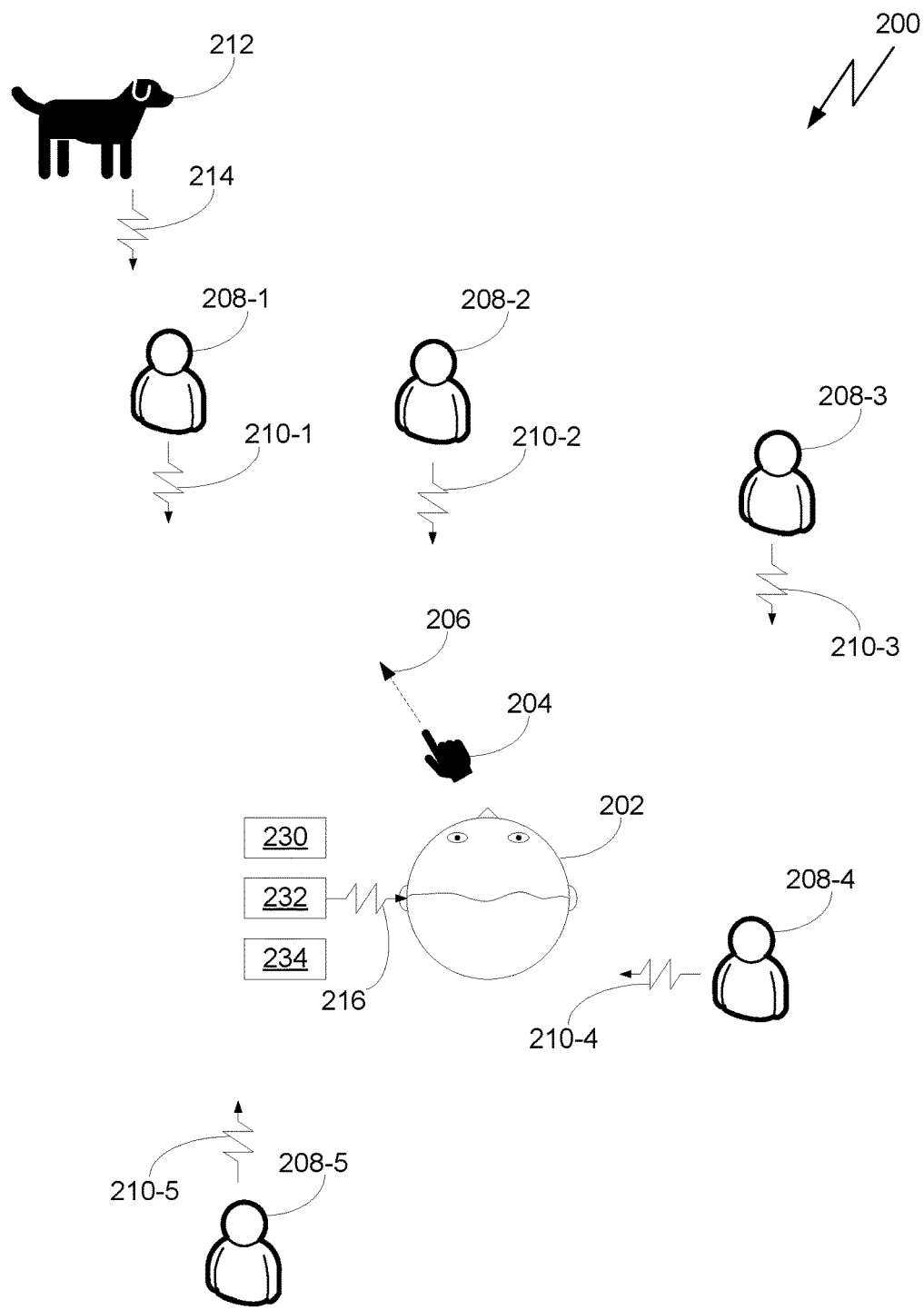
FIGS. 2A-2D illustrate the sound modification system of FIG. 1 modifying audio signals originating from a direction of interest based on user inputs, according to various embodiments.

FIGS. 2A-2D illustrate the sound modification system of FIG. 1 modifying audio signals originating from a direction of interest based on user inputs, according to various embodiments. As shown in FIG. 2A, a user 202 of sound modification system 100 is located in auditory environment 200. For example, as shown in FIG. 2A auditory environment 200 includes multiple persons 208 speaking and a dog 212 barking. Respective audio signals 210 originate from persons 208, and audio signal 214 originates from dog 212. For example, audio signal 210-1 includes the speech of person 208-1, audio signal 210-2 includes the speech of person 208-2, and so forth. As another example, audio signal 214 includes the barking of dog 212. User 202 in auditory environment 200 is carrying or wearing an implementation of sound modification system 100. Sensor devices 234 (e.g., sensor devices 134) of sound modification system 100 monitor user 202 for hand gestures and changes in orientation and/or location. Microphones 230 (e.g., microphones 130) capture audio signals from auditory environment 200, including audio signals 210 and 214. Microphones 230 include a directional microphone or a microphone from which a microphone beam can be steered in a certain direction. An audio output device 232 (e.g., audio output device 132) can output an output audio signal 216 to user 202 (e.g., to the ears of user 202).

As shown in FIG. 2A, user 202 performs a hand gesture 204, in particular a pointing gesture pointing toward person 208-1 and dog 212. Sensor devices 234 detect gesture 204 and transmit the sensor data corresponding to gesture 204 to sound modification application 150. Sound modification application 150 determines a direction of interest 206, based on the sensor data, as the direction toward which gesture 204 is pointing. Sound modification application 150 orients microphones 230 toward direction of interest 206.

Figure 2B:
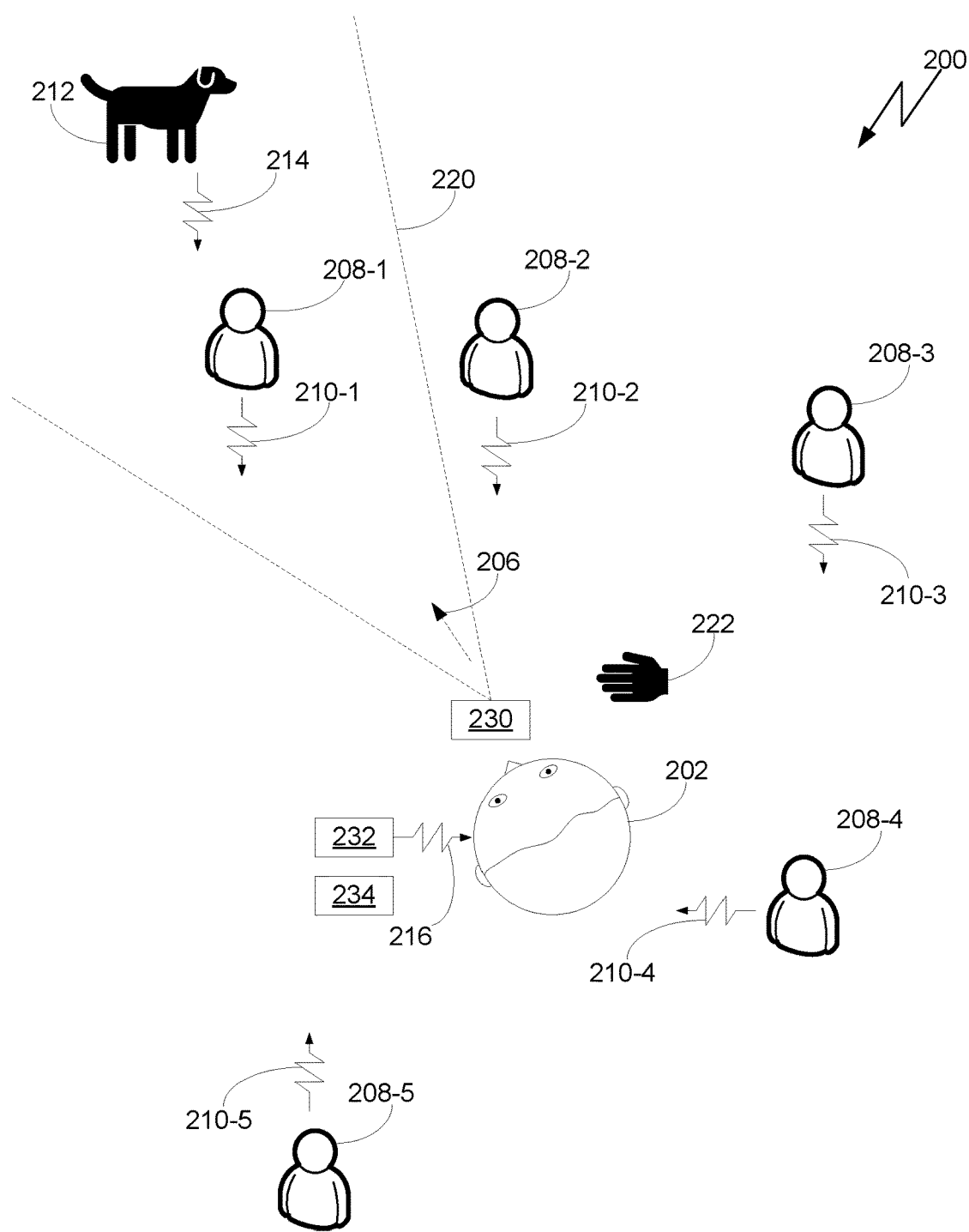

FIG. 2B illustrates auditory environment 200, with a directional field 220 of microphones 230 oriented toward direction of interest 206. As described above, sound modification application 150 orients microphones 230 toward direction of interest 206. Accordingly, a directional field 220 of microphones 230 is oriented toward direction of interest 206. Microphones 230 capture audio signals originating from directional field 220, including audio signals 210-1 and 214.

Further as shown in FIG. 2B, subsequent to hand gesture 204, user 202 performs another hand gesture 222, in particular a palm gesture. Sensor devices 234 detect gesture 222 and transmit the sensor data corresponding to gesture 222 to sound modification application 150. Sound modification application 150 determines one or more sound modification parameters based on gesture 222. In some embodiments, sound modification application 150 determines a direction of modification (e.g., enhance or suppress) and optionally a magnitude of modification based on gesture 222. In some embodiments, sound modification application 150 determines a direction of modification (e.g., enhance or suppress) and applies a default magnitude of modification to the determined direction of modification. For example, a palm lift-up gesture could indicate that the user wants sounds originating from direction of interest 206 enhanced, and a palm press down gesture would indicate that the user wants sounds originating from direction of interest 206 suppressed. Sound modification application 150 can determine a magnitude of modification from a magnitude of the lift up or press down of the palm (e.g., distance of travel of the palm in the gesture). In some embodiments, user 202 can perform gestures 204 and 222 can be performed in immediate succession, and both gestures can be detected by sensor devices 234.

Sound modification application 150 processes captured audio signals originating within directional field 220 (e.g., audio signals 210-1 and 214) to determine the dominant or salient frequency bands within those audio signals. For example, sound modification application 150 determines that audio signal 214 includes a dominant frequency band in the 1 kHz-2 kHz range. Sound modification application 150 generates a parametric equalizer setting targeting the 1 kHz-2 kHz range for modification based on the parameters determined based on gesture 222.

Figure 2C:
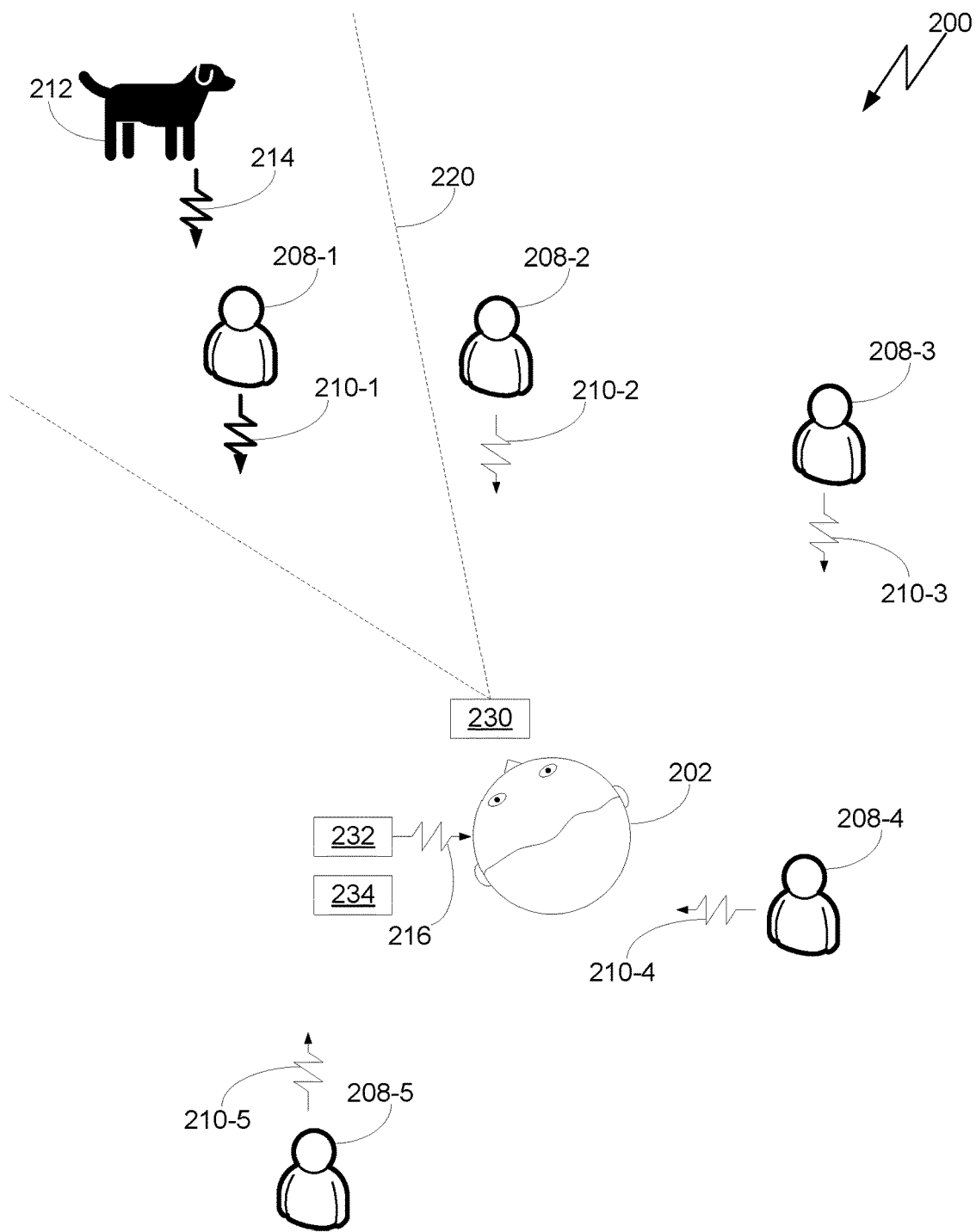

Sound modification application 150 applies the parametric equalizer setting to audio signals 210-1 and 214 captured in directional field 220. Accordingly, the parametric equalizer setting is effective in modifying audio signals 210-1 and 214 in the dominant frequency band, as shown in FIG. 2C. In some embodiments, sound modification application 150 also applies the parametric equalizer setting to audio signals captured by an omnidirectional microphone. Sound modification application 150 outputs to audio output devices 232 an audio signal 216 that includes the modified audio signals 214 and 210-1, as well as other captured audio signals 210-2 thru 210-5 to which the parametric equalizer setting is not applied. In some embodiments, microphones 230 includes multiple omnidirectional microphones, then sound modification application 150 can also apply the parametric equalizer setting to audio signals captured by the omnidirectional microphone closest to direction of interest 206 and/or oriented in a direction closest to direction of interest 206.

While sound modification application 150 is modifying audio signals originating from directional field 220, user 202 can turn his or her head away from direction of interest 206.

Figure 2D:
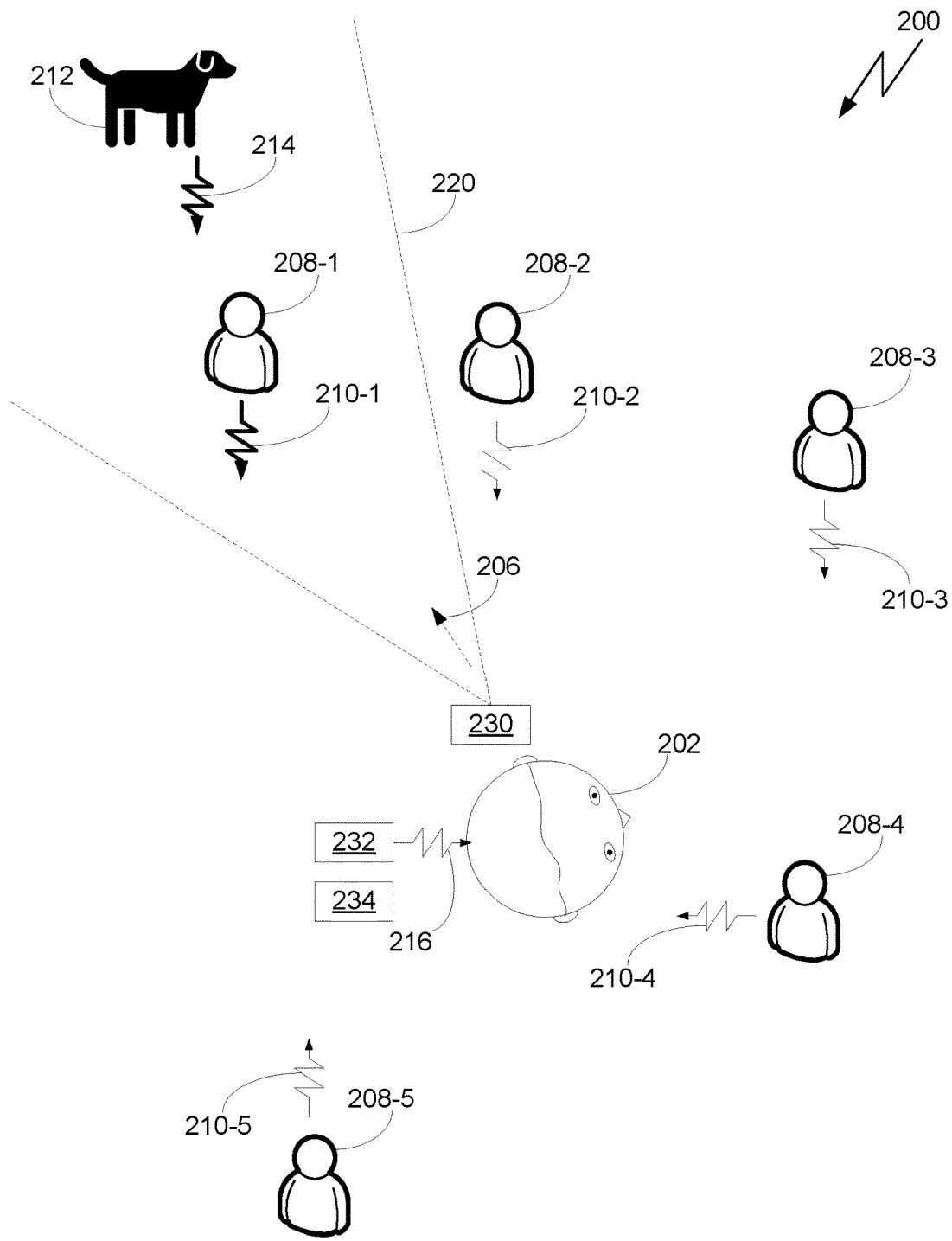

As shown in FIG. 2D, user 202 has turned his or her head away from direction of interest 206. By turning his or her head, user 202 can disturb the directional orientation of microphones 230. Sound modification application 150 can detect the head-turning by user 202 via sensor devices 234 (e.g., inertial measurement sensors). Even with the head turning, sound modification application 150 maintains direction of interest 206 for microphones 230. Sound modification application 150 can make any appropriate adjustments to microphones 230 (e.g., physically re-orienting the microphones, adjusting the beamforming processing) to maintain the orientation of directional field 220 toward direction of interest 206. Accordingly, sound modification application 150 continues to modify audio signals 210-1 and 214. Sound modification application 150 can maintain direction of interest 206 until user 202 indicates a new direction of interest (e.g., with another pointing gesture similar to gesture 204) or user 202 commands sound modification application 150 to cease modifying audio signals.

In various embodiments, sound modification system 100 ignores movement by sound sources (e.g., persons 210 and dog 212 shown in FIGS. 2A-2D). Thus, if dog 212 moves away from direction of interest 206, and accordingly outside of directional field 220, sound modification application 150 can continue to modify other audio signals originating from directional field 220. In some embodiments, sound modification application 150 can periodically re-analyze audio signals originating from directional field 220 to confirm the dominant frequency bands or determine new dominant frequency bands. In some other embodiments, sound modification application 150 can detect that sounds in the dominant frequency bands have significantly changed (e.g., due to dog 212 moving away from direction of interest 206 and audio signal 214 no longer found in directional field 220) and in response re-analyzing audio signals originating from directional field 220 to confirm the dominant frequency bands or determine new dominant frequency bands.

In some further embodiments, sound modification application 150 can simply modify audio signals originating from directional field 220 without regard for dominant frequency bands. For example, returning to FIG. 2C, sound modification application 150 can enhance or suppress audio signals 210-1 and 214 originating from directional field 220 without targeting specific frequencies; sound modification application 150 can simply increase or decrease whatever audio signals are captured by directional microphone 230, if directional microphone 230 is highly direction-focused.

It should be appreciated that while FIGS. 2A-2D illustrates direction of interest 206 determined along a two-dimensional plane (e.g., compass directions around the user), the disclosed embodiments are applicable to a three-dimensional direction of interest (e.g., compass directions and pitch angle) and modification of audio signals based on the three-dimensional direction of interest.

Figure 3:
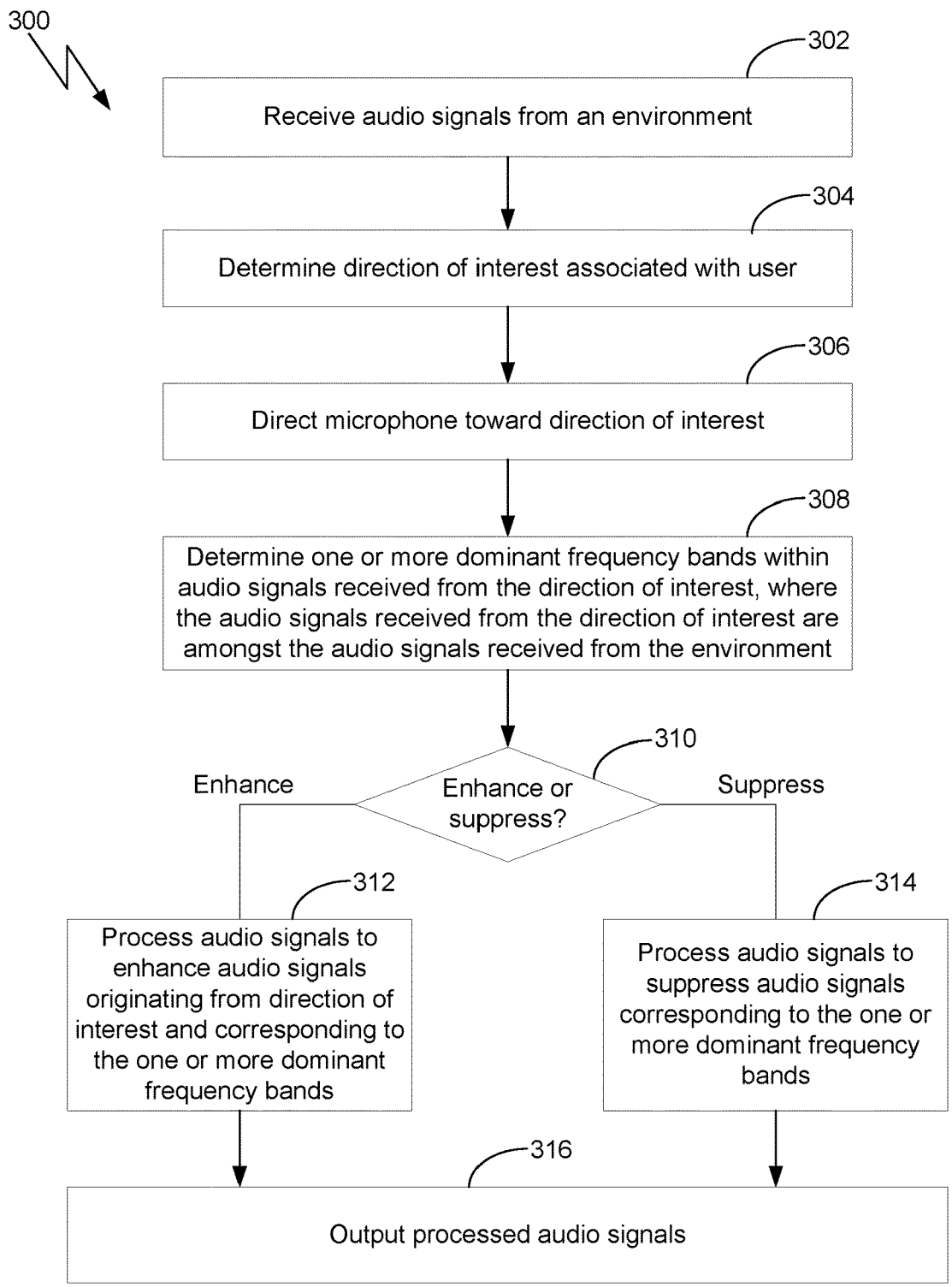
FIG. 3 is a flow diagram of method steps for modifying audio signals originating from a direction of interest, according to various embodiments.

FIG. 3 is a flow diagram of method steps for modifying audio signals originating from a direction of interest, according to various embodiments. Although the method steps are described with respect to the systems of FIGS. 1-2D, persons skilled in the art will understand that any system configured to perform the method steps, in any order, falls within the scope of the various embodiments.

As shown, method 300 begins at step 302, where sound modification application 150 of a sound modification system 100 receives audio signals from an environment. Sound modification application 150 receives from microphones 130 audio signals from multiple sources. The audio signals can include audio signals originating from a direction, captured by a directional microphone, and can additionally or alternatively include an omnidirectional audio signal. For example, microphones 230 can capture audio signals 210 and 214, and sound modification application 150 receives these audio signals.

At step 304, sound modification application 150 determines a direction of interest associated with a user. Sound modification application 150 can receive a user input (e.g., a pointing gesture) indicating a direction of interest via input devices 138 and/or sensor devices 134 and determine a direction of interest 206 based on the user input. In some embodiments, sound modification application 150 determines a direction of interest based on inputs in addition or alternatively to an input explicitly made by the user (e.g., based on an eye gaze of the user, based on the direction the user is facing). In some embodiments, sound modification application 150 further determines one or more sound modification parameters based on user inputs.

At step 306, sound modification application 150 directs a microphone toward the direction of interest. Sound modification application 150 can physically orient a directional microphone in microphones 130 toward the direction of interest, so that the directional field of the directional microphone is oriented toward the direction of interest (e.g., directional field 220 oriented toward direction of interest 206). Similarly, sound modification application 150 can steer a microphone beam using microphones 130 to focus on audio signals originating from the direction of interest (e.g., beamforming the audio signals to mimic a directional field 220 oriented toward direction of interest 206).

At step 308, sound modification application 150 determines one or more dominant frequency bands within audio signals received from the direction of interest, where the audio signals received from the direction of interest are amongst the audio signals received from the environment. Sound modification application 150 analyzes the audio signals originating from directional field 220 (e.g., audio signals 210-1 and 214 in FIG. 2B) to determine one or more dominant frequency bands.

At step 310, sound modification application 150 determines whether to modify the audio signals originating from the direction of interest by enhancing or by suppressing. Sound modification application 150 can determine whether to enhance or suppress based on a user input (e.g., a second gesture indicating sound modification parameters following a first gesture indicating the direction of interest). If sound modification application 150 determines to enhance the audio signals, then method 300 proceeds to step 312. If sound modification application 150 determines to suppress the audio signals, then method 300 proceeds to step 312.

At step 312, sound modification application 150 processes the audio signals to enhance audio signals originating from direction of interest and corresponding to the one or more dominant frequency bands. For example, sound modification application 150 could generate a parametric equalizer setting targeting the dominant frequency bands determined in step 308 for enhancement and applies the parametric equalizer setting to the audio signals originating from directional field 220 (e.g., audio signals 210-1 and 214 in FIG. 2C), thereby modifying those audio signals at the dominant frequency bands by enhancing the audio signals at those dominant frequency bands. The method then proceeds to step 316.

At step 314, As another example, sound modification application 150 processes the audio signals to suppress audio signals corresponding to the one or more dominant frequency bands. For example, sound modification application 150 could generate a parametric equalizer setting targeting the dominant frequency bands determined in step 308 for suppression and applies the parametric equalizer setting to an omnidirectional audio signal captured by microphones 230, thereby suppressing the portion in the omnidirectional audio signal corresponding to the dominant frequency bands and the direction of interest. Sound modification application 150 can further process audio signals originating from directional field 220 to de-amplify (e.g., decrease the amplitude of) those audio signals. The method then proceeds to step 316.

At step 316, sound modification application 150 outputs the processed audio signals. Sound modification application 150 outputs the processed audio signals originating from directional field 220 and/or a processed omnidirectional audio signal to audio output devices 132, for output to the user. Additional audio signals can be mixed with the processed audio signals in the output to audio output devices 132. For example, processed audio signals originating from directional field 220 to which an enhancing parametric equalizer setting has been applied could be mixed with an unmodified omnidirectional audio signal. As another example, de-amplified audio signals originating from directional field 220 could be mixed with an omnidirectional audio signal to which a suppressing parametric equalizer setting has been applied.

In sum, an audio system selectively modifies audio signals originating from a direction of interest. A user of the audio system indicates a direction of interest by a gesture input, among other possibilities. The user can also set a sound modification parameter (e.g., whether to amplify or suppress sound) via an additional gesture input, among other possibilities. The audio system directs one or more microphones to capture audio signals from the environment, in particular focusing on audio signals originating from the direction of interest. The audio system determines one or more dominant audio frequency bands within the audio signals originating from the direction of interest. The audio system may then modify the audio signals, originating from the direction of interest, that correspond to the dominant frequency band(s) by enhancing those the dominant frequency band(s) in the audio signals originating from the direction of interest. The audio system may alternatively modify the audio signals by suppressing the dominant frequency band(s) in omnidirectional audio signals. The audio system may maintain the microphone direction even when the user moves or turns his or her head.

One technical advantage of the disclosed techniques relative to the prior art is that the audio system can enhance desired audio signals and/or reduce unwanted audio signals, thereby providing the user with increased control over the surrounding acoustic environment. Accordingly, the user can more effectively pay attention to sounds that demand increased attention, without the distraction of undesirable sounds. Another technical advantage of the disclosed techniques is that sounds originating from a direction of interest can be modified in a more simplified implementation compared to prior art techniques. Accordingly, directional sound modification can be provided at a lower cost. These technical advantages provide one or more technological improvements over prior art techniques.

1. In some embodiments, a computer-implemented method comprises determining a first direction of interest associated with a user; receiving a set of audio signals associated with the first direction of interest; determining a first dominant frequency band within the set of audio signals; modifying a first portion of the set of audio signals corresponding to the first dominant frequency band; and outputting the modified set of audio signals.

2. The method of clause 1, wherein determining the first direction of interest associated with the user comprises determining the first direction of interest based on a pointing gesture by the user pointing toward the first direction of interest.

3. The method of clauses 1 or 2, wherein determining the first direction of interest associated with the user comprises determining the first direction of interest based on a head direction or an eye gaze direction of the user toward the first direction of interest.

4. The method of any of clauses 1-3, wherein modifying the first portion of the set of audio signals corresponding to the first dominant frequency band comprises modifying the first portion of the set of audio signals based on a first user input indicating at least one of a direction or a magnitude of the modifying.

5. The method of any of clauses 1-4, wherein the first user input is made by the user subsequent to a second user input indicating the first direction of interest.

6. The method of any of clauses 1-5, wherein modifying the first portion of the set of audio signals corresponding to the first dominant frequency band comprises generating a parametric equalizer setting associated with the dominant frequency band.

7. The method of any of clauses 1-6, wherein receiving the set of audio signals associated with the first direction of interest comprises physically orienting a directional microphone toward the first direction of interest.

8. The method of any of clauses 1-7, wherein receiving the set of audio signals associated with the first direction of interest comprises applying beamforming to audio signals captured by a microphone.

9. The method of any of clauses 1-8, further comprising determining a second dominant frequency band within the set of audio signals; and modifying a second portion of the set of audio signals corresponding to the second dominant frequency band.

10. The method of any of clauses 1-9, wherein outputting the modified set of audio signals comprises mixing the modified set of audio signals with an omnidirectional audio signal.

11. In some embodiments, a system comprises a microphone; an audio output device; a memory storing an application; and a processor that, when executing the application, is configured to determining a first direction of interest associated with a user; receiving, via the microphone, audio signals associated with the first direction of interest; determining at least one dominant frequency band within the audio signals; modifying at least one portion of the audio signals corresponding to the at least one dominant frequency band; and outputting the modified audio signals to the audio output device.

12. The system of clause 11, wherein the microphone comprises a directional microphone, and receiving the audio signals associated with the first direction of interest comprises physically orienting a directional microphone toward the first direction of interest.

13. The system of clauses 11 or 12, wherein receiving the audio signals associated with the first direction of interest comprises applying beamforming to audio signals captured by the microphone.

14. The system of any of clauses 11-13, further comprising a sensor device, and wherein the processor, when executing the application, is further configured to detect a user input indicating the first direction of interest via the sensor device.

15. The system of any of clauses 11-14, further comprising a sensor device, and wherein the processor, when executing the application, is further configured to orient the microphone toward the first direction of interest; after orienting the microphone, detect movement associated with the user; and in response to detecting the movement associated with the user, continue to orient the microphone toward the first direction of interest.

16. In some embodiments, one or more non-transitory computer-readable storage media include instructions that, when executed by one or more processors, cause the one or more processors to perform the steps of determining a first direction of interest associated with a user; receiving a set of audio signals; determining a first dominant frequency band within a first portion of the set of audio signals associated with the first direction of interest; modifying at least a portion of the set of audio signals corresponding to the first dominant frequency band; and outputting the modified set of audio signals.

17. The one or more computer-readable storage media of clause 16, wherein modifying at least the portion of the set of audio signals corresponding to the first dominant frequency band comprises generating a parametric equalizer setting associated with the dominant frequency band, wherein the parametric equalizer setting enhances audio signals corresponding to the first dominant frequency band; and applying the parametric equalizer setting to the first portion of the set of audio signals associated with the first direction of interest.

18. The one or more computer-readable storage media of clauses 16 or 17, wherein modifying at least the portion of the set of audio signals corresponding to the first dominant frequency band comprises generating a parametric equalizer setting associated with the dominant frequency band, wherein the parametric equalizer setting suppresses audio signals corresponding to the first dominant frequency band; and applying the parametric equalizer setting to the set of audio signals, wherein the set of audio signals corresponds to an omnidirectional audio signal.

19. The one or more computer-readable storage media of any of clauses 16-18, wherein modifying at least the portion of the set of audio signals corresponding to the first dominant frequency band comprises generating a parametric equalizer setting associated with the dominant frequency band, wherein the parametric equalizer setting enhances audio signals corresponding to the first dominant frequency band; applying the parametric equalizer setting to the first portion of the set of audio signals associated with the first direction of interest to generate equalized audio signals; inverting the equalized audio signals; and mixing the inverted and equalized audio signals with audio signals corresponding to the omnidirectional audio signal.

20. The one or more computer-readable storage media of any of clauses 16-19, wherein modifying at least the portion of the set of audio signals corresponding to the first dominant frequency band comprises generating a parametric equalizer setting associated with the dominant frequency band, wherein the parametric equalizer setting enhances audio signals corresponding to the first dominant frequency band; applying the parametric equalizer setting to the first portion of the set of audio signals associated with the first direction of interest to generate equalized audio signals; inverting the equalized audio signals; and outputting the inverted and equalized audio signals to the user.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   determining a direction of interest associated with a user;
   receiving a set of audio signals associated with the direction of interest;
   determining one or more salient frequency bands within the set of audio signals;
   in response to receiving a command from the user to enhance or suppress the set of audio signals, enhancing or suppressing a portion of the set of audio signals corresponding to the one or more salient frequency bands to create a modified set of audio signals; and
   outputting the modified set of audio signals.

2. The method of claim 1, wherein determining the direction of interest associated with the user comprises determining the direction of interest based on a pointing gesture by the user pointing toward the direction of interest.

3. The method of claim 1, wherein determining the direction of interest associated with the user comprises determining the direction of interest based on a head direction or an eye gaze direction of the user toward the direction of interest.

4. The method of claim 1, wherein enhancing or suppressing the portion of the set of audio signals corresponding to the one or more salient frequency bands comprises modifying the portion of the set of audio signals based on a user input indicating at least one of a direction or a magnitude of the enhancing or suppressing.

5. The method of claim 4, wherein the user input is made by the user subsequent to another user input indicating the direction of interest.

6. The method of claim 1, wherein enhancing or suppressing the portion of the set of audio signals corresponding to the one or more salient frequency bands comprises generating a parametric equalizer setting associated with the one or more salient frequency bands.

7. The method of claim 1, wherein receiving the set of audio signals associated with the direction of interest comprises physically orienting a directional microphone toward the direction of interest.

8. The method of claim 1, wherein receiving the set of audio signals associated with the direction of interest comprises applying beamforming to audio signals captured by a microphone.

9. The method of claim 1, wherein the one or more salient frequency bands include a dominant frequency band.

10. The method of claim 1, wherein outputting the modified set of audio signals comprises mixing the modified set of audio signals with an omnidirectional audio signal.

11. A system, comprising:
    a microphone;
    an audio output device;
    a memory storing an application; and
    a processor that, when executing the application, is configured to:
       determining a direction of interest associated with a user;
       receiving, via the microphone, audio signals associated with the direction of interest;
       determining one or more salient frequency bands within the audio signals;
       in response to receiving a command from the user to enhance or suppress the audio signals, enhancing or suppressing a portion of the audio signals corresponding to the one or more salient frequency bands to create modified audio signals; and
       outputting the modified audio signals to the audio output device.

12. The system of claim 11, wherein the microphone comprises a directional microphone, and receiving the audio signals associated with the direction of interest comprises physically orienting a directional microphone toward the direction of interest.

13. The system of claim 11, wherein receiving the audio signals associated with the direction of interest comprises applying beamforming to audio signals captured by the microphone.

14. The system of claim 11, further comprising a sensor device, and wherein the processor, when executing the application, is further configured to detect a user input indicating the direction of interest via the sensor device.

15. The system of claim 11, further comprising a sensor device, and wherein the processor, when executing the application, is further configured to:
    orient the microphone toward the direction of interest;
    after orienting the microphone, detect movement associated with the user; and
    in response to detecting the movement associated with the user, continue to orient the microphone toward the direction of interest.

16. One or more non-transitory computer-readable storage media including instructions that, when executed by one or more processors, cause the one or more processors to perform the steps of:
    determining a direction of interest associated with a user;
    receiving a set of audio signals;
    determining one or more salient frequency bands within a portion of the set of audio signals associated with the direction of interest;
    in response to receiving a command from the user to enhance or suppress the set of audio signals, enhancing or suppressing a portion of the set of audio signals corresponding to the one or more salient frequency bands to create a modified set of audio signals; and
    outputting the modified set of audio signals.

17. The one or more non-transitory computer-readable storage media of claim 16, wherein enhancing or suppressing the portion of the set of audio signals corresponding to the one or more salient frequency bands comprises:
    generating a parametric equalizer setting associated with the one or more salient frequency bands, wherein the parametric equalizer setting enhances audio signals corresponding to the one or more salient frequency bands; and applying the parametric equalizer setting to the portion of the set of audio signals associated with the direction of interest.

18. The one or more non-transitory computer-readable storage media of claim 16, wherein enhancing or suppressing the portion of the set of audio signals corresponding to the one or more salient frequency bands comprises:

generating a parametric equalizer setting associated with the one or more salient frequency bands, wherein the parametric equalizer setting suppresses audio signals corresponding to the one or more salient frequency bands; and applying the parametric equalizer setting to the set of audio signals, wherein the set of audio signals corresponds to an omnidirectional audio signal.

19. The one or more non-transitory computer-readable storage media of claim 16, wherein enhancing or suppressing the portion of the set of audio signals corresponding to the one or more salient frequency bands comprises:

generating a parametric equalizer setting associated with the one or more salient frequency bands, wherein the parametric equalizer setting enhances audio signals corresponding to the one or more salient frequency bands;

applying the parametric equalizer setting to the portion of the set of audio signals associated with the direction of interest to generate equalized audio signals;

inverting the equalized audio signals; and mixing the inverted and equalized audio signals with audio signals corresponding to an omnidirectional audio signal.

20. The one or more non-transitory computer-readable storage media of claim 16, wherein enhancing or suppressing the portion of the set of audio signals corresponding to the one or more salient frequency bands comprises:

generating a parametric equalizer setting associated with the one or more salient frequency bands, wherein the parametric equalizer setting enhances audio signals corresponding to the one or more salient frequency bands;

applying the parametric equalizer setting to the portion of the set of audio signals associated with the direction of interest to generate equalized audio signals; and inverting the equalized audio signals.

* * * * *